Nov. 24, 1925.
E. L. JONES ET AL
1,562,703
CENTER IRON
Filed Aug. 15, 1922
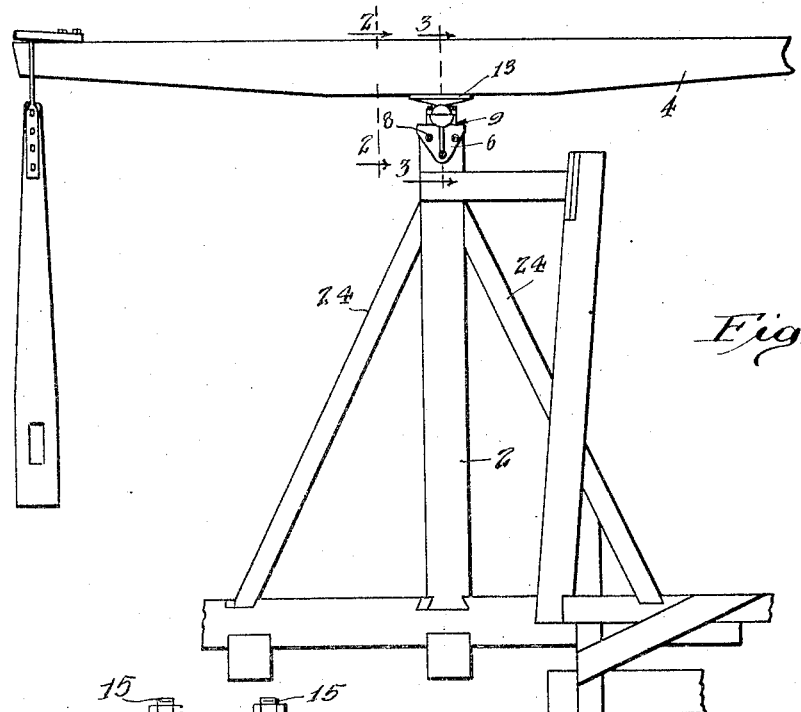
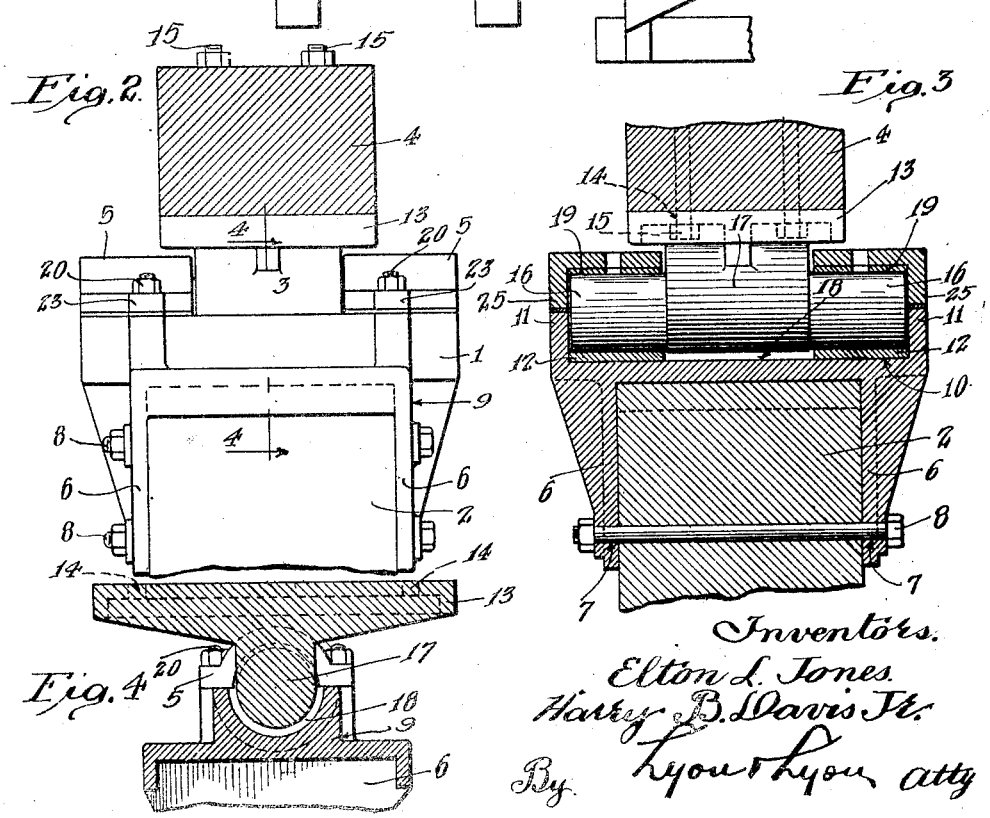
Inventors.
Elton L. Jones.
Harry B. Davis Jr.
By Lyon & Lyon atty Patented Nov. 24, 1925.

1,562,703

UNITED STATES PATENT OFFICE.

ELTON L. JONES AND HARRY B. DAVIS, JR., OF TAFT, CALIFORNIA.

CENTER IRON.

Application filed August 15, 1922. Serial No. 581,939.

*To all whom it may concern:*

Be it known that we, ELTON L. JONES and HARRY B. DAVIS, Jr., citizens of the United States, residing at Taft, in the county of Kern and State of California, have invented a new and useful Center Iron, of which the following is a specification.

This invention relates to new and useful improvements in center irons which are used in oil well equipment to pivotally mount a "walking beam" on a "Samson post" whereby the walking beam may impart a reciprocating motion to actuate an oil pump.

Center irons for this purpose are commonly constructed having two separated members or castings adapted to be bolted to each side of the Samson post and each providing a bearing or half bearing for one of the trunnions of the saddle on which the "walking beam" rocks. With such a construction the bearings are difficult to align and do not tend to remain in permanent alignment. This causes an unnecessary wear on the bearings, an increase in the friction, shortens the life of the center iron and requires considerable attention. Furthermore, the bearings are difficult to properly lubricate and dust, water and other foreign matter may work into the bearings.

An object of this invention is to provide a center iron in which both bearings are formed in the same casting or member and thereby maintained in permanent alignment.

Another object of this invention is to provide bearings which are enclosed, permitting the bearings to retain the oil, and preventing dust, water or other foreign matter contaminating the bearings.

Another object of this invention is to provide the bearing with a reservoir for maintaining a supply of oil whereby the bearings may be thoroughly lubricated and will require less attention.

Another object of this invention is to decrease the number of parts required in a center iron.

Another object of this invention is to eliminate the difficulty of aligning the bearings when securing the center iron to the Samson post.

Another object of this invention is to provide a more economical and sturdy center iron.

With the foregoing preliminary remarks this invention will be more readily understood by reference to the following drawings, illustrating a preferred embodiment of the invention.

Figure 1 is an elevation of this embodiment of the invention illustrating part of the oil well pumping equipment with the center iron secured to the Samson post and pivotally supporting the walking beam, one end of which is broken off to contract the view.

Fig. 2 is an end elevation of the mechanism illustrated in Fig. 1 with the walking beam sectioned as indicated at 2—2 in Fig. 1.

Fig. 3 is an end elevation sectioned as indicated by the line 3—3 in Fig. 1.

Fig. 4 is a front elevation sectioned as indicated by the line 4—4 in Fig. 2.

Referring to the drawings, we have illustrated in Fig. 1 an upright Samson post 2 held in place by a number of braces 24. In the figure these braces are shown as constituting part of an oil derrick. To the upper end of the Samson post 2 is secured the center iron which is used to provide a walking beam 4 with a pivot bearing. The center iron consists mainly in a supporting member 1, a saddle member 3 and two complementary cover plates 5.

The supporting member 1 consists of a body portion 9 which is provided with two opposed downwardly extending anchor plates 6 which are intended to abut opposite faces of the Samson post 2. The anchor plates 6 contain a number of openings 7 through which bolts 8 may be passed and secure the supporting member 1 to the Samson post 2. The body portion 9 is shaped to provide a longitudinal groove 10 which is transverse to the axis of the Samson post 2, semi-circular in section and closed at the ends by flanges 11 provided by the body portion 9. At opposite ends of the longitudinal groove 10 bearing metal is placed around the semi-circular groove, thereby forming a bearing 12 at each end of the groove. The body portion 9 is provided with bosses 23 of which four are shown. These bosses are threaded to accommodate bolts 20 and positioned at each side the bearings 12.

The saddle member 3 contains at seat 13 on which the walking beam 4 rests. Said seat 13 is provided with a number of openings 14 through which bolts 15 may be passed and secure the saddle member 13 to the walking beam 4. The seat 13 is recessed to enclose the heads of the bolts. The saddle member 3 is further provided with a portion 17 extending below the seat forming two trunnions 16 which are adapted to fit the bearings 12 of the supporting member 1.

The bearings 12 and trunnions 16 maintain the extending portion 17 of the saddle 3 above the bottom of the groove 10, thus providing a space or oil reservoir 18 intermediate the bearings 12.

The cover plates 5 are shaped to contain bearing material forming upper half bearings 19 which fit over the top of the trunnions 16. The cover plates 5 are provided with flanges 25 which enclose the upper ends of the bearings and trunnions, and further provided with bosses 23 having openings through which the bolts 20 pass securing these cover plates 5 to the supporting member 1.

It can be seen that by providing in one member or casing both bearings for the saddle, these bearings are permanently aligned, that the oil reservoir and flanges covering the bearings will provide proper lubrication to the bearings and that the bearings can not be contaminated by dust, water or other foreign matter.

While the particular embodiment described is well suited for the purposes of our invention, it should be undestood that various modifications of the same could be made without departing from the spirit of the invention. Our invention is not limited to the particular embodiment shown but is of the scope set forth in the following claims.

We claim:

1. A center iron for mounting a walking beam or the like, comprising a one piece supporting member providing a horizontal trough closed at the ends and having opposed anchor plates depending from adjacent the ends of said trough, bushings positioned at opposed ends of said trough and spaced apart, a saddle member having a downward extension terminating in opposed trunnions, revolvably mounted by said bushings, the saddle member being shaped to leave an oil chamber between said bushings, and complementary cover plates having depending end flanges adapted to enclose the trunnions from above and at their ends.

2. A center iron for mounting a walking beam or the like, comprising a one piece member having a horizontal semi-cylindrical groove in its upper side and having parallel anchor plates extending below said groove adjacent the ends thereof and ribs extending along the outer side of said anchor plates and at right angles thereto, spaced apart bushings positioned at opposed ends of said groove, a saddle member having a depending extension terminating in trunnions revolvable in said bushings, and complementary cover plates having depending end flanges adapted to enclose the said bushings from above and at their ends.

3. A center iron for mounting a walking beam or the like, comprising a one-piece member adapted to closely fit the upper end of a Samson post, said supporting member providing a trough closed at the ends and having opposed anchor plates depending from the adjacent ends of the trough, bushings positioned at the ends of said trough and spaced apart, a saddle member having an outward extension terminating in opposed trunnions revolvably mounted by said bushings, the saddle member being vertically spaced to provide an oil chamber between said bushings and complementary cover plates having depending flanges adapted to enclose said bushings from above and at their ends.

4. A center iron for mounting a walking beam or the like, comprising a one-piece member adapted to closely fit a Samson post and to rest upon the upper end thereof, said one-piece member having a horizontal semi-cylindrical groove in its upper side and having parallel anchor plates extending below said groove adjacent the ends thereof, and rods extending along the outer side of said anchor plates and at right angles thereto, spaced apart bushings positioned at opposed ends of said grooves, a saddle member having a depending extension terminating in trunnions revolvable in said bushings, and cover plates adapted to receive complementary bushings and having depending end flanges adapted to enclose said bushings from above and at their ends.

Signed at Taft, California this 8th day of August, 1922.

ELTON L. JONES.
HARRY B. DAVIS, Jr.